United States Patent
Enochs et al.

(10) Patent No.: US 12,277,812 B1
(45) Date of Patent: Apr. 15, 2025

(54) SYSTEMS AND METHODS FOR ASSESSING VEHICLE DAMAGE

(71) Applicant: United Services Automobile Association (USAA), San Antonio, TX (US)

(72) Inventors: Andrew Luke Enochs, San Antonio, TX (US); Matthew Conrad Dahlman, Selma, TX (US); Shawn D. Low, San Antonio, TX (US); Daniel Diaz, San Antonio, TX (US); Breanna Nicole Allerkamp, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 559 days.

(21) Appl. No.: 17/241,899

(22) Filed: Apr. 27, 2021

Related U.S. Application Data

(60) Provisional application No. 63/015,916, filed on Apr. 27, 2020.

(51) Int. Cl.
*G07C 5/08* (2006.01)
*B60R 25/02* (2013.01)
(Continued)

(52) U.S. Cl.
CPC ............ *G07C 5/0808* (2013.01); *B60R 25/02* (2013.01); *G01N 27/20* (2013.01); *G07C 5/006* (2013.01); *G08B 21/182* (2013.01)

(58) Field of Classification Search
None
See application file for complete search history.

(56) References Cited

U.S. PATENT DOCUMENTS

| | | | |
|---|---|---|---|
| 7,150,179 B2 * | 12/2006 | Takafuji | B60R 21/0136 73/12.09 |
| 7,475,587 B2 * | 1/2009 | Kithil | G01L 5/0052 73/12.09 |

(Continued)

FOREIGN PATENT DOCUMENTS

| | | | |
|---|---|---|---|
| JP | 2004155251 A | * | 6/2004 |
| JP | 2004165845 A | * | 6/2004 |
| JP | 2012117297 A | * | 6/2012 |

OTHER PUBLICATIONS

Machine translation of JP-2012117297-A (Year: 2012).*
Machine translation of JP-2004155251-A (Year: 2004).*
Machine translation of JP-2004165845-A (Year: 2004).*

*Primary Examiner* — Amelia Vorce
*Assistant Examiner* — Kyle S Park
(74) *Attorney, Agent, or Firm* — Fletcher Yoder, P.C.

(57) ABSTRACT

A technique for assessing a vehicle condition is provided that determines whether damage has occurred to the vehicle using electrical property data acquired by one or more electrical property detection systems disposed on one or more surfaces of the vehicles. The electrical property detection system include a conductive polymer material that changes in response to chemical deformations and/or mechanical deformations in the conductive polymer material, which may result from objects and/or other vehicles damaging the conductive polymer material. Based on the electrical property data, a control system may generate a damage assessment output, such as an alert for a vehicle owner.

13 Claims, 3 Drawing Sheets

(51) Int. Cl.
*G01N 27/20* (2006.01)
*G07C 5/00* (2006.01)
*G08B 21/18* (2006.01)

(56) References Cited

U.S. PATENT DOCUMENTS

| | | | | |
|---|---|---|---|---|
| 7,716,002 | B1* | 5/2010 | Smith | G01L 5/0052 |
| | | | | 702/113 |
| 10,937,103 | B1* | 3/2021 | Marlow | G06Q 40/08 |
| 2002/0021481 | A1* | 2/2002 | Lin | G02F 1/163 |
| | | | | 359/275 |
| 2010/0163675 | A1* | 7/2010 | Rashid | B64C 1/1484 |
| | | | | 73/75 |
| 2013/0192917 | A1* | 8/2013 | Matsuda | B60R 21/38 |
| | | | | 180/274 |
| 2018/0208138 | A1* | 7/2018 | Wakabayashi | G01L 1/16 |
| 2019/0371090 | A1* | 12/2019 | Lin | G07C 5/0808 |
| 2020/0013160 | A1* | 1/2020 | Francis | G01N 29/12 |
| 2020/0023900 | A1* | 1/2020 | Jonasson | B62D 15/0265 |
| 2020/0072779 | A1* | 3/2020 | Ye | B60R 16/023 |
| 2021/0150922 | A1* | 5/2021 | Kanagarajan | G08G 5/0026 |

\* cited by examiner

SYSTEMS AND METHODS FOR ASSESSING VEHICLE DAMAGE

CROSS-REFERENCE TO RELATED APPLICATION

The present application claims priority to and the benefit of U.S. Provisional Patent Application Ser. No. 63/015,916, titled "Systems and Methods for Assessing Vehicle Damage," which was filed on Apr. 27, 2020, and which is herein incorporated by reference in its entirety for all purposes.

BACKGROUND

The present disclosure relates generally to systems and methods for assessing vehicle damage. More specifically, the present disclosure relates to techniques to provide an assessment of vehicle damage and characteristics of the vehicle damage and to assemble a vehicle damage assessment output.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Damage to vehicles may be expensive and time-consuming to repair for the vehicle owner. At least in some instances, it may be difficult to determine a party at fault for damage to a vehicle after a collision. For example, it may be difficult for the vehicle owner to determine whether damage to the vehicle occurred as a result of the collision with an object (e.g., another vehicle, a physical barrier, a mailbox), or if the damage occurred at an earlier point in time (e.g., a collision with another vehicle, a collision with a trash can on garbage day, another vehicle backing into the vehicle while the vehicle is parked in a garage). It is now recognized that there is a need to improve the assessment of vehicle damage prior to, during, and/or after a collision between the vehicle and the object has occurred.

SUMMARY OF THE INVENTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a system. The system includes at least one processor. The system also includes a tangible, non-transitory, computer-readable medium, including instructions that, when executed by the at least one processor, cause the at least one processor to receive an indication of damage to a vehicle. The instructions, when executed by the at least one processor, also cause the at least one processor to instruct one or more electrical property detection systems to acquire electrical property data of one or more conductive polymer materials disposed on one or more surfaces of the vehicle in response to receiving the indication. Further, the instructions, when executed by the at least one processor, cause the at least one processor to compare the electrical property data acquired by the one or more electrical property detection systems to one or more reference electrical property data. Further still, the instructions, when executed by the at least one processor, cause the at least one processor to identify a change in an electrical property of the one or more conductive polymer materials based on the comparison between the electrical property data and the one or more reference electrical property data. Further still, the instructions, when executed by the at least one processor, cause the at least one processor to generate a vehicle damage assessment output based on the change in the electrical property. Even further, the instructions, when executed by the at least one processor, cause the at least one processor to provide the vehicle damage assessment output.

In another embodiment, the present disclosure relates to a system. The system includes a plurality of electrical property detection systems disposed on one or more surfaces of a vehicle, wherein each electrical property detection system of the plurality of electrical property detection systems comprises a conductive coating and is configured to acquire electrical property data associated with the conductive coating. The system also includes a control system communicatively coupled to the plurality of electrical property detection systems. The control system is configured to receive an indication of possible damage to the vehicle. The control system is also configured to instruct a subset of the plurality of electrical property detection systems to acquire the electrical property data associated with a respective conductive coating in response to receiving the indication. Further, the control system is configured to compare the electrical property data acquired by the subset of electrical property detection systems to one or more reference electrical property data. Further still, the control system is configured to identify a change in an electrical property of one or more conductive polymer materials of the subset of electrical property detection systems based on the comparison between the electrical property data and the one or more reference electrical property data. Further still, the control system is configured to generate a vehicle damage assessment output based on the change in the electrical property. Even further, the control system is configured to provide the vehicle damage assessment output.

In another embodiment, the present disclosure relates to a method. The method includes instructing, via at least one processor, one or more electrical property detection devices to acquire electrical property data associated with a respective conductive coating of a vehicle. The method also includes comparing, via the at least one processor, the electrical property data acquired by the one or more electrical property detection devices to reference electrical property data. Further, the method includes identifying, via the at least one processor, a change in an electrical property of one or more conductive polymer materials of the one or more electrical property detection devices based on the comparison between the electrical property data and the reference electrical property data. Further still, the method includes determining, via the at least one processor, that there is damage to the vehicle based on the change in the electrical property. Even further, the method includes outputting, via the at least one processor, a control signal to activate one of more vehicle damage mitigation devices of the vehicle based on the determined damage to the vehicle.

DRAWINGS

These and other features, aspects, and advantages of the present disclosure will become better understood when the following detailed description is read with reference to the accompanying drawings in which like characters represent like parts throughout the drawings, wherein.

Figure 4:
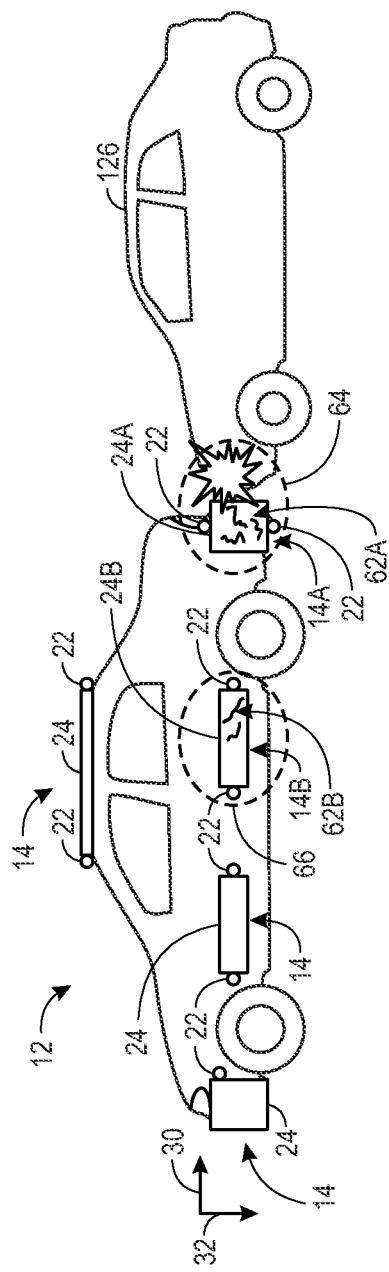
Figure 5:
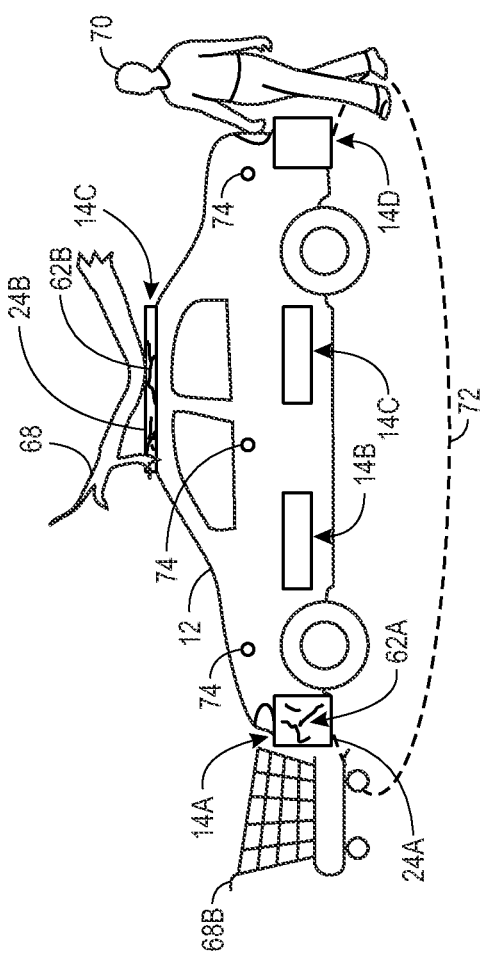

FIG. 4 illustrates a vehicle including material coating disposed on one or more surfaces of the vehicle and an additional vehicle after a collision involving the two vehicles, in accordance with embodiments described herein; and FIG. 5 illustrates a vehicle including a material coating disposed on one or more surfaces of the vehicle after one or more objects have impacted a region overlapping with the one or more surfaces, in accordance with embodiments described herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Damage to a vehicle (e.g., a car, a truck, a boat, and the like) may often trigger the vehicle owner to engage in multiple activities (e.g., scheduling repairs, determining a party at fault for the damage, filing insurance claims, and the like), which may be time-consuming and relatively expensive for the vehicle owner and/or manager. At least in some instances, the vehicle owner may not identify that damage has occurred to the vehicle until a relatively long time period (e.g., an hour, hours, days, weeks, and months) after the damage has occurred, and therefore, determining a source or cause of the damage may be difficult. For example, the vehicle owner may identify vehicle damage after the vehicle was parked, stored, or otherwise in a key-off state. However, it may be difficult for the vehicle owner to prove that the vehicle damage resulted while the vehicle was parked rather than occurring from a collision involving the vehicle and another vehicle, from an object impacting (e.g., falling on, colliding with, etc.), or otherwise prior to the vehicle being parked. Certain conventional techniques for determining damage to a vehicle include using imaging devices and cameras that are resident on the vehicle itself or from external sources (e.g., traffic cameras). However, imaging devices and cameras may have a limited viewing angle, and thus, it may be difficult to determine a magnitude of the damage as well as whether the damage occurred on a particular region of the vehicle. Accordingly, the present disclosure is directed to a vehicle damage assessment system that may facilitate determinations of where and when the vehicle damage occurred, the magnitude of the vehicle damage, and well as controlling certain operations of the vehicle that may prevent further damage. Embodiments of the present disclosure facilitate vehicle damage detection via conductive materials that experience detectable changes in their electrical properties in response to physical contact or damage. These conductive materials may be incorporated into one or more exterior surfaces of a vehicle to provide data used for vehicle damage assessment.

Figure 1:
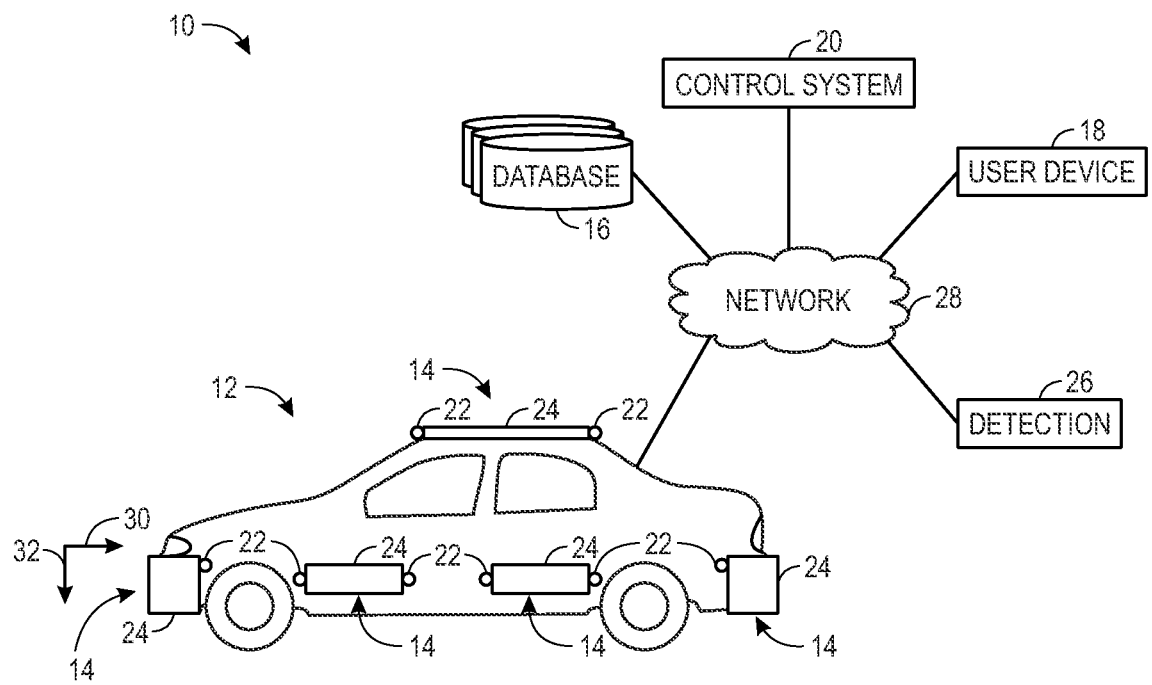
FIG. 1 illustrates a schematic diagram of a vehicle damage assessment system, in accordance with embodiments described herein.

FIG. 1 is a block diagram of a vehicle damage assessment system 10 that includes a vehicle 12, one or more electrical property detection systems 14, one or more databases 16, a user device 18, and a control system 20. In general, the control system 20 may instruct the one or more electrical property detection systems 14 to acquire electrical property data (e.g., conductivity, resistance, current) related to a region of the vehicle 12 where the one or more electrical property detection systems 14 are located. Based on the acquired electrical property data, the control system 20 may generate a damage assessment output such as notification for the user device 18 associated with a vehicle owner that includes an indication of vehicle damage, a magnitude of the vehicle damage, a time range associated with the vehicle damage, a location of the damage, a vehicle damage claim associated with the owner of the vehicle 12 based the vehicle damage, and/or a time reconstruction of the damage (e.g., whether or not another vehicle that caused the damage was slowing, stopping, or accelerating), which may facilitate the determination of who is at fault for causing the damage. In some embodiments, the user of the vehicle damage assessment system 10 may be owner of multiple vehicles 12 that each include one or more electrical property detection systems that may enable the owner to track a vehicle condition across multiple vehicles (e.g., a fleet).

As shown in the illustrated embodiment of the vehicle damage assessment system 10, the one or more electrical property detection systems 14 include an electrical contact point or terminal, which in embodiments may include one or more electrodes 22, and a conductive polymer material 24 (e.g., damage detection polymer). The electrodes 22 may be arranged to span an electrical path across the conductive polymer material 24. The conductive polymer material 24 is generally a material coating that may be deposited, attached, adhered, applied to, formed integrally with (e.g., during manufacture), or otherwise coupled onto a surface of the vehicle 12 and that conducts current provided by the electrodes 22. In one embodiment, the conductive polymer material 24 is implemented as a vehicle paint. Certain non-limiting examples of such conductive polymer materials 24 include conductive polymers, such as non-heteroatom conductive polymers (e.g., poly(fluorene)s, polyphenylenes, polynapthalenes, polypyrenes, polyazulenes, poly(acetylene)s, poly(p-phenylene vinyele)s, and the like), heteroatom conductive polymers (e.g., polypyrrole, polycarbazoles, polyindoles, polyazepines, polyanilines, polythiophenes, poly(3,4,-ethylenedioxythiophene), poly(p-phenylene sulfide), and the like), and/or conductive inorganic thin films. In an embodiment, the conductive polymer material 24 is a polypyrrole-modified chitosan. It is noted that conductive polymers may be formed and shaped before the conductive polymer is attached to the surface of the vehicle 12, which may facilitate incorporating the conductive polymer material 24 onto existing vehicles (e.g., retrofitting the conductive polymer material 24 onto existing systems and/or providing a disposable or reusable conductive polymer material 24). At least in some instance, the conductive polymer material 24 may include doped conductive polymers (e.g., oxidative doping using halogens and/or oxygen) and/or inorganic thin films (e.g., n-type doping or p-type doping).

In general, the conductive polymer material 24 has electrical properties (e.g., resistivity, conductivity) that change (e.g., increase or decrease) due to chemical deformations (e.g., oxidation) and/or mechanical deformations (e.g., breaking, tearing, and the like) in the conductive polymer material 24 and that manifest as detectable changes in these electrical properties. In certain embodiments, electrical property data refers to data indicative of electrical properties or changes in the electrical properties of one or more regions of the conductive polymer material 24. In one embodiment, the changes are based on properties across the electrodes 22 that are inducing a current in the conductive polymer material 24. For example, the change in the electrical properties of the conductive polymer material 24 may be due to a tear in the conductive polymer material 24 that may increase the bulk resistance of the conductive polymer material 24. Additionally, oxidation of the conductive polymer material 24, such as by exposing a portion of the conductive polymer material 24 to air as a result of the conductive polymer material 24 tearing, may increase and/or decrease the bulk resistance of the conductive polymer material 24. For example, the bulk resistance of certain conductive polymers (e.g., polypyrrole) may decrease due to oxidation, while the bulk resistance of other conductive polymers (e.g., polyacetylene) may increase due to oxidation. In some embodiments, the conductive polymer material 24 may include a passivation layer of a suitable polymer and/or thin film that is relatively less likely to oxidize, such as chitosan, polytetrafluoroethylene (PTFE), and the like. As such, a mechanical deformation in the passivation layer may expose a portion of an underlying conductive polymer material 24 to air, causing the portion of the conductive polymer material 24 to oxidize. Moreover, as certain polymers (e.g., chitosan) may at least partially repair when exposed to ultraviolet (UV) radiation, it should be noted that incorporation of chitosan or other UV-repairing polymers in the conductive polymer material 24 may enable the system 10 to detect damage to the vehicle 12 as well as at least partially repair the damage to the vehicle 12

Accordingly, damage to the vehicle 12 may be detectable based on the change in the electrical properties of the conductive polymer material 24, although a visible sign of damage (e.g., a scratch) may be difficult to see, e.g., when the damage is slight or, in certain embodiments, due to the self-healing properties of another polymer (e.g., chitosan). Providing the conductive polymer material 24 onto one or more surfaces of the vehicle 12 (e.g., on the roof of vehicle, on a front and/or back bumper, along a portion of the doors) may facilitate detection of vehicle damage in regions overlapping with the one or more surfaces of the vehicle 12. That is, vehicle damage may produce the chemical deformations and/or mechanical deformations to the conductive polymer material 24, which result in a detectable change in the electrical properties of the conductive polymer material 24. The detectable changes may be assessed based on the properties of the circuit created between the electrical contact points (e.g., a first electrode 22 and a second electrode 22) connected by the conductive polymer material 24. When the circuit is active, there are measureable changes in the electrical properties of the circuit based on changes in the condition of the connecting conductive polymer material 24. For example, for a given known applied voltage across the conductive polymer material 24, the current across the circuit can be measured to determine the resistance across the conductive polymer material 24. Changes in resistance are indicative of changes in the condition of the conductive polymer material 24. The system may include one or more detectors 26 (e.g., multimeters) coupled to the electrodes 22 and/or the conductive polymer material 24 and that are configured to detect these changes in the electrical properties. The conductive polymer material or materials 24 may be shielded by one or more additional insulating coatings on an exterior-facing side.

While, in the illustrated embodiment, each electrical property detection system of the one or more electrical property detection systems 14 includes only two electrodes 22 and one conductive polymer material 24, the one or more electrical property detection systems 14 may each include any suitable number of electrodes 22 and/or conductive polymer materials 24 (e.g., 2, 3, 4, 5, 6, 7, and 8). For example, each electrical property detection system 14 may include an array of multiple conductive polymer materials 24 that are each electrically coupled to two or more electrodes 22. That is, the electrical property detection system 14 may include n number of conductive polymer materials 24 arranged in parallel along the x-axis 30 and m number of conductive polymer materials 24 arranged in parallel along y-axis 32. Arranging the conductive polymer materials 24 in an array may enable the control system to obtain more granular information regarding the damage (e.g., a point of impact, subsequent points of impact, a change in the magnitude of the subsequent points). For example, after a collision between the vehicle 12 and an addition vehicle, the more granular information regarding the damage may facilitate determining actions taken by a driver of the vehicle 12 or another driver of an additional vehicle involved in the damage (e.g., did the driver of the vehicle 12 or the additional vehicle slow down or speed up and/or turn into or away from the vehicle 12 after a collision), which may be used by the vehicle owner, manager, and/or third parties (e.g., law enforcement, insurance agencies, property owners where the vehicle damage occurred, and the like) to determine a cause of and/or fault for the vehicle damage.

As mentioned above, the control system 20 may determine that a vehicle 12 has been damaged based on a change in the electrical properties of the conductive polymer material 24. That is, the control system 20 may compare a measured electrical property data of the one or more conductive polymer materials 24 of the one or more electrical property detection systems 14 to a baseline or reference electrical property data. For example, in some instances, the control system 20 may acquire a reference electrical property data periodically (e.g., every 1 minute, 2 minutes, 3 minutes, 4 minutes, 5 minutes, 10 minutes) and/or concurrently with certain vehicle operations of the car (e.g., when the car is transitioning from a key-on to a key-off state, from a key-off to a key-on state). In some instances, the control system 20 may store one or more previously acquired sets of reference electrical property data or may discard duplicative datasets (e.g., repeated datasets that are indicative of no damage) to minimize the amount of data stored.

In any case, the control system 20 may activate the one or more electrical property detection systems 14 to acquire electrical property data associated with one or more conductive polymer materials 24 when the vehicle is running and/or in an off state. In some instances, the control system 20 may acquire electrical property data during operation of the vehicle in response to the control system 20 receiving feedback associated with certain operations of the vehicle 12 (e.g., an acceleration, a horn being honked, a change in a direction of travel of the vehicle 12, proximity of vehicle 12 to another object and/or object, the brakes locking, the brakes being activating and the like) related to actions of the driver that made indicate a likelihood of damage occurring or having occurred (e.g., taking a sharp turn, harsh braking, and the like). To determine the actions taken by the driver of the vehicle 12, the control system 20 may be communicatively coupled to certain on-board diagnostics of the vehicle 12 (e.g., connecting to the vehicle 12 via an OBD-II port). Moreover, the control system 20 may be capable of receiving data from sensors of the vehicle 12, such as proximity detectors, and use the data from the sensors for controlling operation of the one or more electrical property detection systems 14.

In one example, in response to the control system 20 receiving feedback indicative of the drive of the vehicle 12 taking a sharp turn and/or applying the brakes, the control system 20 may send a control signal that activates an electrical path across the conductive polymer material 24, e.g., causes the electrodes 22 to apply a voltage across the conductive polymer material 24 to acquire the electrical property data. The control system 20 may then compare the acquired electrical property data to a reference electrical property data to identify changes in the electrical property data relative to the reference electrical property data. The control system 20 may use the changes in the electrical property data relative to the reference electrical property data to generate collision information, such as a point of impact, subsequent points of impact, and the like. In some embodiments, at least a portion of the electrical property data acquired in response to the control system the feedback may be used as the reference electrical property data.

In another example, the aspects of the present disclosure may be implemented to monitor vehicle damage for a fleet of a vehicles 12. For example, each vehicle 12 may include a respective control system 20 that controls operation of the electrical property detection systems 14 for the respective vehicle 12. The control systems 20 may activate to acquire the electrical property data based on geo-fencing data, such as when the vehicle(s) 12 return to a parking or storage facility of the fleet of vehicles 12. In other embodiments, the control systems 20 may periodically (e.g., every hour, after several hours, when the vehicles 12 are turned on, when the vehicles are turned off, etc.) activate the electrical property detection systems 14 of the respective vehicles 12 and transmit the electrical property data to the database 16, a master controller 20, and/or a user device 18 associated with the manager of the fleet of vehicles 12.

Figure 2:
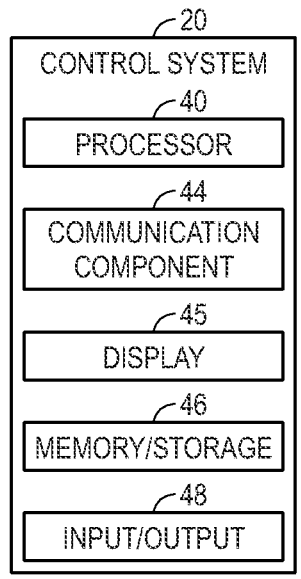
FIG. 2 illustrates a block diagram of a computing system that may be used in conjunction with the system of FIG. 1, in accordance with embodiments described herein.

To perform one or more operations described herein, the control system 20 may include various types of components that may assist the control system 20 in performing the operations described below. For example, as shown in FIG. 2, the control system 20 may include a processor 40, a communication component 44, a display 45, memory/storage 46, an input/output (I/O) port 48, and the like.

The processor 40 may be any type of computer processor or microprocessor capable of executing computer-executable code. The processor 40 may also include multiple processors that may perform the operations described below. The communication component 44 may be a wireless or wired communication component that may facilitate communication between the control system 20, the databases 16, and various other computing systems via the network 17, the Internet, or the like. The display 45 may depict visualizations associated with software or executable code being processed by the processor 40. In one embodiment, the display 45 may be a touch display capable of receiving inputs from a user of the control system 20. The display 45 may be any suitable type of display, such as a liquid crystal display (LCD), plasma display, or an organic light emitting diode (OLED) display, for example. Additionally, in one embodiment, the display 45 may be provided in conjunction with a touch-sensitive mechanism (e.g., a touch screen) that may function as part of a control interface for the control system 20.

The memory and the storage 46 may be any suitable articles of manufacture that can serve as media to store processor-executable code, data, or the like. These articles of manufacture may represent computer-readable media (e.g., any suitable form of memory or storage) that may store the processor-executable code used by the processor 40 to perform the presently disclosed techniques. As used herein, applications may include any suitable computer software or program that may be installed onto the control system 20 and executed by the processor 40. The memory and the storage 46 may represent non-transitory computer-readable media (e.g., any suitable form of memory or storage) that may store the processor-executable code used by the processor 40 to perform various techniques described herein. It should be noted that non-transitory merely indicates that the media is tangible and not a signal. The I/O ports 48 may be interfaces that may couple to other peripheral components such as input devices (e.g., keyboard, mouse), the electronic detection systems 14, input/output (I/O) modules, and the like.

In addition to the control system 20, the user device 18, as well as other suitable computing devices described herein may include the components described above for the control system 20. It should be noted that the components described above with regard to the control system 20 are exemplary components and the control system 20 may include additional or fewer components than shown.

The vehicle damage assessment system 10 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Included in the system is a user device 18 from which the initial query regarding a vehicle condition may be generated. The user device may be a general-purpose personal computer, a laptop computer, a tablet computer, a mobile computer, a mobile device (e.g., cell phone), etc. The control system 20 may be in communication with the user device 18 and configured to receive the initial query via an interface of the user device 18.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

It should be noted that the components described above with regard to the control system 20 are exemplary components and the control system 20 may include additional or fewer components as shown.

Figure 3:
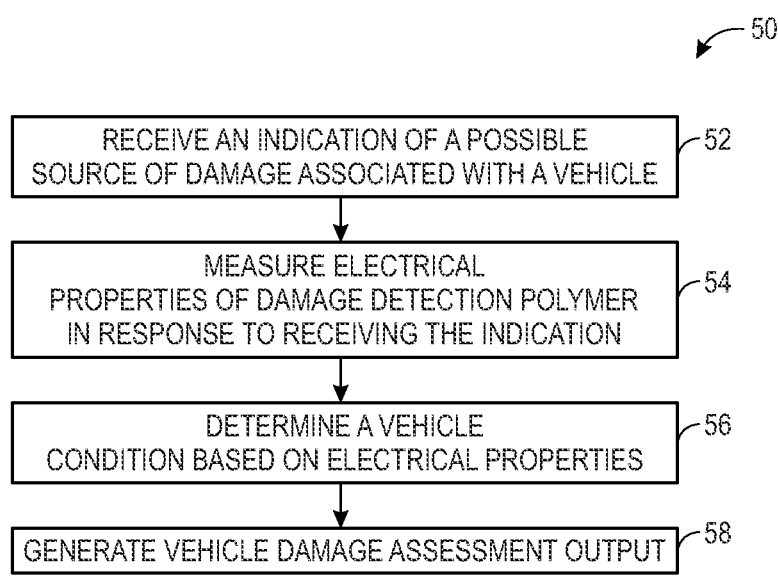
FIG. 3 illustrates a flow diagram for assessing vehicle damage based on a change in electrical properties of a material coating disposed on one or more surfaces of the vehicle, in accordance with embodiments described herein.

As discussed above, the control system 20 may communicate with one or more electrical property detection systems 14 to acquire electrical property data associated with one or more conductive polymer materials 24. FIG. 3 illustrates an example process 50 that may be employed by the control system 20 to generate a damage assessment output. Before proceeding, it should be noted that the process 50 described below is described as being performed by the control system 20, but the process 50 may be performed by other suitable computing devices.

Referring now to FIG. 3, at block 52, the control system 20 may receive an indication of a possible source of damage associated with the vehicle 12. In an embodiment, the indication may be generated based on a signal from one or more vehicle sensors, such as driving operation sensors, a tire pressure sensor, an engine function sensor, or a sensor that indicates a type of vehicle malfunction. For example, as discussed above, the indication may be feedback associated with a driving condition of the vehicle 12 (e.g., an acceleration, a change in direction, proximity of vehicle 12 to another object, the brakes locking, and the like) that is indicative of a vehicle status or certain actions taken by the driver of the vehicle 12 (e.g., a turn being performed that is above a threshold turning magnitude, brakes being applied above a threshold braking magnitude, and the like) before and/or during a collision. In some embodiments, the control system 20 may compare the feedback to a threshold condition, such as a braking threshold or a proximity threshold, and, in response to the feedback being above the threshold condition, proceed to block 54. In some embodiments, the indication may be received in response to the proximity sensors being activated, such as when the car is in a key-off position and an object and/or person approaches the vehicle 12. In certain embodiments, such as the vehicle 12 is part of a fleet of vehicles, the indication may be indicative of the vehicle(s) 12 returning to a storage or parking location. That is, the indication may be generated as part of regular maintenance procedures for the vehicle 12, e.g., at check-in, check-out, or at scheduled intervals.

At block 54, the control system 20 may acquire electrical property data using the one or more electrical property detection systems 14. For example, the control signal may activate the electrodes 22 to cause the electrodes 22 of the one or more electrical property detection systems 14 to induce a current (or apply a voltage) across the one or more conductive polymer materials 24 and the one or more electrical property detection systems 14 may acquire data indicative of the electrical property of the one or more conductive polymer materials 24 based on the current provided to the one or more conductive polymer materials. In some embodiments, the control signal may acquire electrical property data from a subset of the one or more electrical property detection systems 14 based on the indication. That is, the control systems 20 may determine a location of the vehicle 12 (e.g., based on a relative direction of travel of the possible source of damage) where a collision is likely occur based on feedback received from certain sensors (e.g., imaging devices and/or proximity sensors) and instruct the subset of the one or more sensors that are associated with the location to acquire the electrical property data. By activating only a subset of the electrical property detection systems 14, the control system 20 gathers less electrical property data, and thus, may operate more efficiently.

At block 56, the control system 20 may determine a vehicle condition (e.g., whether or not the vehicle is damaged) of the vehicle 12 based on the electrical property data. In some embodiments, determining the vehicle condition may include identifying a subset of the conductive polymer materials 24 of the electrical property detection systems 14 where the acquired electrical property data has changed relative to a respective reference electrical property data, which may be indicative of a damage to the vehicle as discussed herein. In some embodiments, determining the vehicle condition of the vehicle 12 based on the electrical property data includes determining a magnitude of the change for each acquired electrical property data. In some embodiments, determining the vehicle condition of the vehicle 12 may include comparing the change in the electrical property data to a threshold and determining the vehicle condition based on whether the change in the electrical property data is above or below the threshold.

At block 58, the control system 20 may generate a vehicle damage assessment output. In some embodiments, the vehicle damage assessment output may be a control signal or activation signal that causes one or more damage mitigation devices of the car to operate, such as activating lights of the vehicle (e.g., hazard lights, interior lights, and headlights), deactivating one or more seat belts and/or one or more locking devices of the vehicle 12 (e.g., to facilitate the riders of the vehicle exiting the vehicle), braking mechanisms, or otherwise change operation of the vehicle, which may prevent further damage to the vehicle. As a further non-limiting example, the control signal may be output to a controller of the vehicle 12 that may control steering mechanisms based on the indication (e.g., a location of the collision) such that the driver does not steer too aggressively and cause additional damage to the vehicle. In some embodiments, the vehicle damage assessment output may be an alert transmitted to the user device 18 associated with an owner of the vehicle 12. For example, the alert may warn the owner of the vehicle(s) 12 that the vehicle 12 was likely damaged as well as the extent of the damage (e.g., determined based on a magnitude and/or subset of the one or more electrical property detection systems with a change in their respective electrical property data that is indicative of damage) and/or a time period when the vehicle was likely damaged.

Additionally or alternatively, the vehicle condition output may include a relative ordering of the acquired electrical property data based on time and/or magnitude of damage, which may facilitate a determination of the cause of the damage. For example, the vehicle condition output may indicate the one or more electrical property detection systems 14 that are damaged, the magnitude of the damage, and/or a comparison of the magnitude of the damage. At least in some instances, the control system 20 the vehicle condition output may also provide the one or more electrical property detection systems 14 that are damaged, the magnitude of the damage, and/or a comparison of the magnitude of the damage as inputs to a model, which may be used to reconstruct the cause of the damage to the vehicle. In an example where the cause of the damage to the vehicle 12 is a collision with an additional vehicle, the inputs to the model may show a decrease in a magnitude of damage to the vehicle (e.g., based on a decrease in the magnitude of the change of electrical property data acquired by the control system) for each electrical property detection system 14 along a length of the vehicle 12. In some instance, the control system 20 may determine that the additional vehicle was applying their brakes during the collision based on the decrease in the magnitude of the damage to the vehicle. As such, the vehicle condition output may indicate the braking, which may indicate how quickly the driver reacted to the potential collision.

Although described in a particular order, which represents a particular embodiment, it should be noted that the process 50 may be performed in any suitable order. Additionally, embodiments of the process 50 may omit process blocks and/or include additional process blocks. Moreover, in some embodiments, the process 50 may be implemented at least in part by executing instructions stored in a tangible, non-transitory, computer-readable medium, such as memory 38 implemented in the control system 20, using processing circuitry, such as a processor 40 implemented in the control system 20.

To illustrate certain aspects of the present disclosure, FIG. 4 shows an example of a vehicle 12*a* with one or more electrical property detection systems 14 having electrodes 22 and conductive polymer materials 24 after a collision with an additional vehicle 12*b*. As shown in the illustrated embodiment, the electrical property detection systems 14*a* and 14*b* each include a deformation 62*a* and 62*b* (e.g., mechanical deformation and/or chemical deformation) in the conductive polymer material 24*a* and 24*b*, which may be a result of the collision between the vehicle 12*a* and the additional vehicle 12*b*. In the depicted embodiment, the electrical property detection system 14*a* is associated with the area 64 of the vehicle 12*a* and the electrical property detection system 14*b* is associated with the area 66 of the vehicle 12*a*. That is, damage within the area 64 may cause a change in the electrical properties of the conductive polymer material 24*a* of the electrical property detection system 14*a*. Similarly, damage within the area 66 may cause a change in the electrical properties of the conductive polymer material 24*b* of the electrical property detection system 14*b*.

The control system 20 may identify that the point of impact of the collision was at the area 64 of the vehicle 12*a* when a time associated with the change in the electrical property data acquired by the electrical property detection system 14*a* is before a time associated with the change in the electrical property data acquired by the electrical property detection system 14*b*. Additionally, the control system 20 may identify that second point of impact of the collision was at the area 66 of the vehicle 12*a* when the time associated with the change in the electrical property data acquired by the electrical property detection system 14*b* is after the time associated with the change in the electrical property data acquired by the electrical property detection system 14*a*.

At least in some instances, the control system 20 may compare the magnitude of change of the electrical property data acquired by the electrical property detection system 14*a* and the electrical property detection system 14*b* may be used to determine certain actions action by the driver of the vehicles 12*a* and/or 12*b* before, during, or after the collision involving the vehicle 12*a* and 12*b*. That is, the relative magnitude of change of the electrical property data may be indicative of the certain actions taken by the driver of the vehicle 12*a* and/or 12*b*. For example, the control system 20 may determine that the magnitude of change of the electrical property data acquired by electrical property detection system 14*a* is within a threshold of the magnitude of change of the electrical property data acquired by the electrical property detection system 14*b*, indicating that a force of impact by the vehicle 12*b* did not change significantly between the areas 66 and 64. This may indicate that the driver of the vehicle 12*b* did not apply the brakes during a portion of the collision. That is, as a non-limiting example, this may indicate that the driver of the vehicle 12*b* was not paying attention during the wreck and, therefore, may be at fault.

While certain aspects of the present disclosure discussed above generally relate to the control system 20 controlling operation of the one or more electrical property detection systems while the vehicle 12 is in a key-on state (e.g., idling and/or driving), the control system 20 may also control operation of the one or more electrical property detection systems 14 while the vehicle 12 is in a key-off state (e.g., parked). FIG. 5 shows an example of a vehicle 12 with one or more electrical property detection systems 14 after multiple objects 68*a* and 68*b* have damaged the vehicle 12. As shown in the illustrated embodiment, the electrical property detection systems 14*a* and 14*b* each include a respective deformation 62*a* and 62*b* (e.g., mechanical deformation and/or chemical deformation) in the conductive polymer materials 24*a* and 24*b*, which may be a result of the objects 68*a* and 68*b* impacting the vehicle 12. The control system 20 may output a control signal that causes the one or more electrical property detection systems 14 to acquire electrical property data in response to the person 70 moving within the area 72 detectable by the proximity detectors 74 of the vehicle. Additionally or alternatively, the control system 20 may output a control signal that causes the one or more electrical property detection systems 14 to acquire electrical property data in response to the objects 68*a* and/or 68*b* colliding with the vehicle based on a movement of the vehicle in response to the collision. In other embodiments, the electrical property detection system/s 14 may be programmed to be continuously active at a low level of induced current that does not drain the vehicle battery.

The control system 20 may also compare the acquired electrical property data to a reference electrical property data, which may be acquired upon person 70 moving within the area 72, when the car was in a key-off position, and/or while the owner of the vehicle 12 was driving the vehicle, and the like. To determine whether the objects 68*a* (e.g., a shopping cart) and/or 68*b* (e.g., a tree branch) collided with the vehicle and resulted in the deformations 62*a* and 62*b*, the control system 20 may determine whether there was a change in the electrical property data relative to the reference electrical property data and whether a time associated with the change corresponds to when the objects 68*a* and 68*b* collided with the vehicle 12. For example, the control system 20 may determine that a change in the electrical properties of the conductive polymer material 24*a* did not occur within a time period corresponding to (e.g., overlapping with) the object 68*a* colliding with the front of vehicle 12. That is, the control system 20 may determine that the electrical property data acquired by the electrical property detection system 14*a* did not change above a threshold relative to a reference electrical property data acquired at some time (e.g., 30 seconds, 1 minute, 5 minutes) before the object 68*a* collided with the vehicle 12. Therefore, the vehicle damage assessment output may indicate that no damage occurred on the front of the vehicle 12 relative to a previously acquired reference electrical property data. The control system 20 may also determine that the change in the electrical properties of the conductive polymer material 24*b* occurred within a time period corresponding the object 68*b* colliding with the vehicle 12. Therefore, the vehicle damage assessment output may also indicated that damage occurred on the roof of the vehicle 12 relative to a previously acquired reference electrical property data.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
   at least one processor;
   a tangible, non-transitory, computer-readable medium, comprising instructions that, when executed by the at least one processor, cause the at least one processor to:
   receive an indication of damage to a vehicle;
   instruct one or more electrical property detection systems to acquire electrical property data of a conductive vehicle paint coating disposed on one or more surfaces of the vehicle in response to receiving the indication, the electrical property data comprising electrical property data corresponding to a first surface of the one or more surfaces of the vehicle and electrical property data corresponding to a second surface of the one or more surfaces of the vehicle;
   compare the electrical property data acquired by the one or more electrical property detection systems to one or more reference electrical property data;
   identify a first magnitude of damage to the first surface of the one or more surfaces of the vehicle based on a first comparison between the electrical property data corresponding to the first surface and the one or more reference electrical property data;
   identify a second magnitude of damage to the second surface of the one or more surfaces of the vehicle based on a second comparison between the electrical property data corresponding to the second surface and the one or more reference electrical property data;
   determine a vehicle condition based on the first magnitude of damage and the second magnitude of damage; and
   generate a vehicle damage assessment output comprising a control signal to the vehicle based on the first magnitude of damage and the second magnitude of damage, wherein the control signal activates one or more locking devices associated with the vehicle, activates lights associated with the vehicle, controls operation of a steering wheel associated with the vehicle, or any combination thereof.

2. The system of claim 1, wherein the indication is received in response to a driving condition of the vehicle being above a threshold, wherein the driving condition of the vehicle comprises a braking magnitude, a turning magnitude, feedback indicating that the vehicle is within a range of another vehicle, an object, or both, or any combination thereof.

3. The system of claim 2, wherein the instructions, when executed by the at least one processor, cause the at least one processor to acquire the one or more reference electrical property data in response to the indication and acquire the one or more electrical property data after acquiring the one or more reference electrical property data.

4. The system of claim 1, wherein the instructions, when executed by the at least one processor, cause the at least one processor to receive the indication in response to the vehicle being parked or the vehicle being turned on.

5. The system of claim 1, wherein the instructions, when executed by the at least one processor, cause the at least one processor to acquire the one or more reference electrical property data in response to the vehicle being turned on.

6. The system of claim 1, wherein the one or more electrical property detection systems are a plurality of electrical property detection systems, and wherein the vehicle damage assessment output comprises a relative ordering of a change in the electrical property data of the plurality of electrical property detection systems based on a time associated with when the change was identified.

7. The system of claim 1, wherein a source of the damage is an additional vehicle, and wherein the vehicle damage assessment output indicates whether the additional vehicle, the vehicle, or both, applied brakes during a collision.

8. The system of claim 1, wherein the vehicle damage assessment output is based on a comparison between the first magnitude of damage and the second magnitude of damage.

9. The system of claim 1, comprising a time reconstruction of damage to the vehicle based on the first magnitude of damage to the vehicle and the second magnitude of damage to the vehicle.

10. A method, comprising:
    instructing, via at least one processor, one or more electrical property detection devices to acquire electrical property data associated with a respective conductive vehicle paint coating of a vehicle disposed on a plurality of surfaces of the vehicle;
    comparing, via the at least one processor, the electrical property data acquired by the one or more electrical property detection devices to reference electrical property data;
    identifying, via the at least one processor, a change in an electrical property of one or more conductive polymer materials of the one or more electrical property detection devices based on a comparison between the electrical property data and the reference electrical property data;
    determining, via the at least one processor, a magnitude of damage to the plurality of surfaces of the vehicle based on the change in the electrical property; and
    outputting, via the at least one processor, a control signal based on the magnitude of damage to the vehicle, wherein the control signal activates one or more locking devices associated with the vehicle, activates lights associated with the vehicle, controls operation of a steering wheel associated with the vehicle, or any combination thereof.

11. The method of claim 10, wherein one or more vehicle damage mitigation devices comprise door locks, and wherein activating the one or more vehicle damage mitigation devices comprises causing the door locks to unlock.

12. The method of claim 10, comprising:
    receiving an indication of a possible source of damage to the vehicle;
    identifying a relative direction of the possible source of damage; and
    selecting the one or more electrical property detection devices from a set of electrical property detection devices on the vehicle based on the relative direction of the possible source of damage.

13. The method of claim 10, comprising a time reconstruction based on a first magnitude of damage corresponding to a first surface of the vehicle and a second magnitude of damage corresponding to a second surface of the vehicle, wherein the first surface is different than the second surface.

* * * * *